United States Patent [19]

Salva

[11] 4,415,040
[45] Nov. 15, 1983

[54] FULLY MOUNTED VARIABLE WIDTH PLOW

[75] Inventor: Henri E. Salva, Croix, France

[73] Assignee: International Harvester Co., Chicago, Ill.

[21] Appl. No.: 290,903

[22] Filed: Aug. 7, 1981

[51] Int. Cl.³ ............................ A01B 3/46; A01B 3/28
[52] U.S. Cl. .................................... 172/225; 172/647; 172/287
[58] Field of Search ............... 172/283, 284, 285, 286, 172/287, 224, 225, 647, 569, 218, 483, 484, 291

[56] References Cited

U.S. PATENT DOCUMENTS

| | | | |
|---|---|---|---|
| 3,817,333 | 6/1974 | Kinzenbaw | 172/283 |
| 3,918,528 | 11/1975 | Kinzenbaw | 172/218 |
| 4,036,305 | 7/1977 | Kinzenbaw | 172/283 |
| 4,049,063 | 9/1977 | Dietrich | 172/283 |
| 4,098,346 | 7/1978 | Stanfill et al. | 172/283 |
| 4,186,806 | 2/1980 | Ward | 172/283 |
| 4,283,071 | 8/1981 | Pedersen | 172/450 |

FOREIGN PATENT DOCUMENTS

481234  2/1952  Canada .

Primary Examiner—George J. Marlo
Attorney, Agent, or Firm—F. David AuBuchon

[57] ABSTRACT

A fully mounted variable width plow of the roll-over type or not in which the tractor hitch links are pivoted about generally vertical axes permitting the hitch limited movement in a horizontal plane, which will allow the adjusted plow to maintain correct alignment under the action of the soil. The plow system includes a plow beam, to the forward end of which a forecarriage is pivotally attached about a vertical axis, and a plurality of interconnected plow bottom assemblies. Actuation of a hydraulic cylinder will result in equal pivotal movement of each plow bottom assembly relative to the plow beam as well as pivotal movement between the forecarriage and the plow beam.

10 Claims, 7 Drawing Figures

FULLY MOUNTED VARIABLE WIDTH PLOW

The prior art adjustable width plows are of the semi-mounted or trailing type rather than fully mounted as is the subject plow. The prior art plows include a pivotable connection between the plow frame and the tractor hitch about which there is pivotal movement when the tractor direction is changed and a steerable rear wheel is required. In the subject fully mounted type plow there is no such pivot or pivotal movement and there is no need for a steerable rear wheel. Also, in the prior art the tractor hitch's movement is restricted such that it cannot move in a horizontal plane, whereas in the subject fully mounted adjustable width plow the tractor hitch is free to move in a horizontal plane. The prior art is represented by the following U.S. Pat. Nos. 3,817,333; 3,918,528; 4,036,305; 4,036,306; 4,049,063; 4,098,346 and 4,186,806.

This invention relates to fully mounted plows whether of the rollover type or not and having a variable width, that is, plows in which the transverse spacing between furrow-cutting lines or so-called lines of action of two adjacent plow bottoms is adjustable in order to obtain a correspondingly variable furrow pitch.

Plows of this type are provided in known manner with a beam which is inclined with respect to the direction of forward travel of the tractor and which carries a plurality of plow bottoms maintained in uniformly spaced and parallel relation by means of a device of the deformable parallelogram type.

Adjustment of the furrow pitch is obtained on the one hand by modifying the common angular position of the plow bottoms with respect to the plow beam and on the other hand by modifying the angular position of the beam with respect to the tractor in order to ensure that the lines of action of the plow bottoms are aligned with respect to the direction of forward travel.

The plow beam is supported at the rear end by a wheel which bears on the ground and at the front end by the rear link-arms of the tractor or so-called "three-point hitch" system by means of a forecarriage unit. In the case of a rollover plow, the beam is capable of undergoing a pivotal displacement through an angle of 180° about a generally longitudinal axis. Such rollover mechanism for two-way plows are conventional and reference may be made to U.S. Pat. No. 3,554,294 for a more detailed disclosure.

The double problem encountered in gang plows lies in the fact that, on the one hand, the furrow-cutting lines or so-called lines of action of the plow bottoms must be parallel to the direction of forward travel while plowing is in progress and after or during adjustment of spacing of said lines of action and that, on the other hand, the line of action of the foremost plow bottom must be displaced transversely to the direction of forward travel in order to be located with respect to the furrow cut during the previous trip at a distance equal to the new spacing set by the furrows.

Although many different solutions have already been proposed for solving this problem, they do not prove wholly satisfactory by reason of the complexity of the means employed.

The aim of the invention is to improve this type of plow with a view to making the plow bottoms capable of moving into the correct work position automatically, that is to say without the aid of the external control means, when a positive control action has set said plow bottoms angularly with respect to their common support beam so as to have the desired spacing between their lines of action.

To this end, the gang plow in accordance with the invention is designed to carry in known manner a plurality of plow bottoms mounted in uniformly spaced relation on a common supporting plow beam, plow-bottom support brackets each rigidly fixed to one bottom and pivoted to the beam about vertical axes, a coupling member pivotally attached to the plow-bottom support brackets in order to define with said plow beam a device consisting of a deformable parallelogram, and a forecarriage unit mounted at the rear ends of hitch link-arms supported by the tractor frame and each capable of slight pivotal displacement about a vertical axis. The distinctive features of the plow in accordance with the invention lie in the fact that positive control means are adapted to produce action between the plow beam and one of the plow-bottom support brackets or the coupling member in order to adjust the angular position of the plow bottoms with respect to the plow beam and therefore the spacing of the lines of action of said plow bottoms, that a coupling member is provided between one of the plow-beam suppot brackets and the forecarriage unit, said coupling member being pivotally mounted on said plow-bottom support bracket and on the forecarriage unit, and that the plow beam is pivoted to the forecarriage unit about a vertical axis. Furthermore, the relative geometrical arrangement of the points of pivotal attachment of the plow beam to the forecarriage unit and to the plow-bottom support brackets and the points of pivotal attachment of the coupling member to said plow-beam support bracket is such that, in response to controlled adjustment of the angular position of the plow bottoms with respect to the plow beam, the assembly constituted by the forecarriage unit, the plow beam, the coupling member, the plow bottoms, the plow-bottom support brackets and the coupling member is displaced as a result of pivotal motion of the link-arms and caused by forces exerted on the plow bottoms by the soil being plowed. Thus the line of action of the foremost plow bottom is intended to be aligned with respect to the direction of forward travel and undergoes a displacement in a suitable direction transversely with respect to said direction of travel over a distance equal to the variation in spacing of the lines of action resulting from the adjustment.

When making use of a system of this type, a single control device varies the spacing of the lines of action of the plow bottoms by pivotally displacing the plow bottoms on the plow beam. This has the effect of obtaining both a correction of inclination or in other words an alignment of the lines of action with respect to the direction of forward travel, and the suitable transverse displacement of the line of action of the foremost plow bottom.

The invention also embodies the following preferential features.

The positive control means consist of a double-acting hydraulic cylinder controlled from the operator's deck of the tractor.

Said hydraulic cylinder produces action on the foremost plow bottom.

The position of the axis of pivotal attachment of the plow beam to the forecarriage unit is adjustable.

The length of the coupling member and/or the position of the axis of pivotal attachment of the coupling member to the plow beam is adjustable.

Should the coupling member be connected to the foremost plow-bottom support bracket, the quadrilateral constituted by the points of pivotal attachment of the forecarriage unit to the coupling member and to the plow beam and the points of pivotal attachment of the foremost plow-bottom support bracket to the coupling member and to the plow beam, for the mean value of spacing of the lines of action of the plow bottoms, form a rectangular trapezoid such that the long base is defined by said points of pivotal attachment of the forecarriage unit and that the short base is defined by said points of pivotal attachment of the foremost support bracket whilst the short side perpendicular to the bases is defined by the points of pivotal attachment of the coupling member.

In the case of a rollover plow system, the forecarriage unit is constructed in two sections pivoted about a longitudinal axis, one section being coupled to the link-arms and the other section being adapted to carry the remainder of the system (plow beam, coupling member, control means, and so forth).

These and other features of the invention will be more apparent to those skilled in the art upon consideration of the following description and accompanying drawings, wherein:

Figure 1:
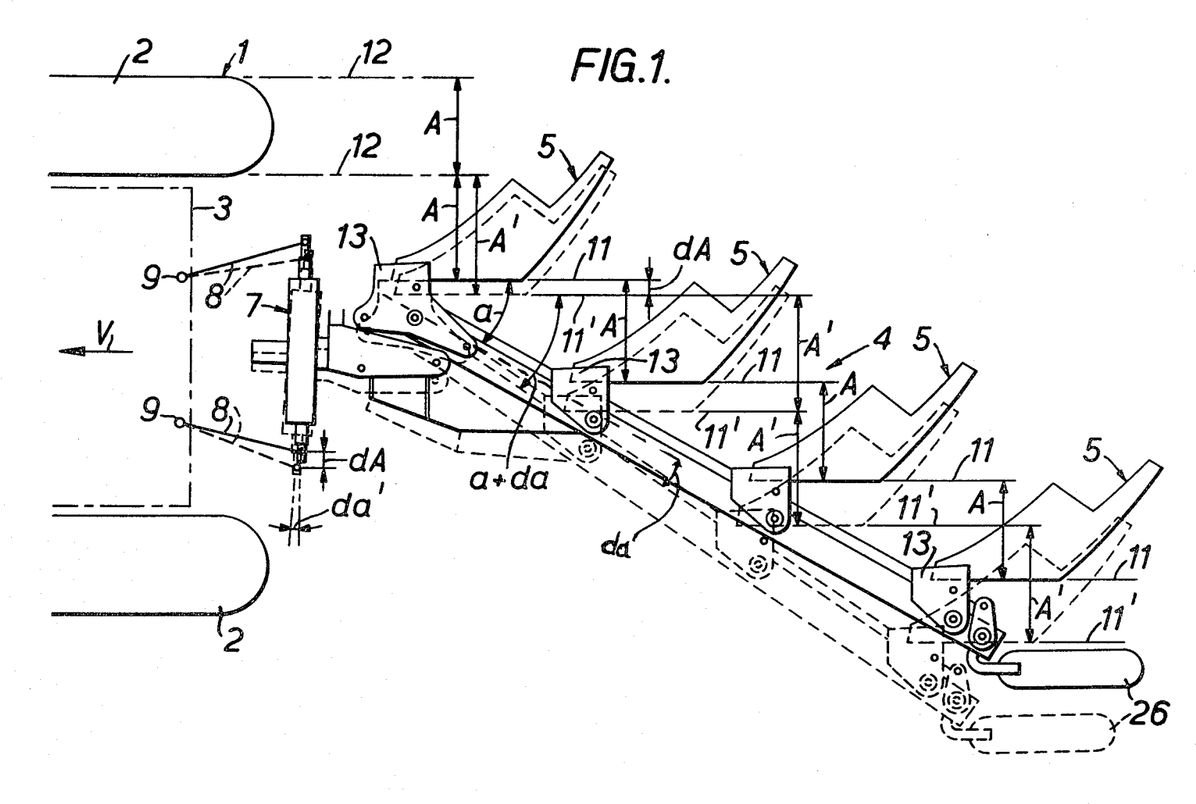
FIG. 1 is a diagrammatic plan view of the plow in accordance with the invention and two sets of lines of action corresponding to two spacings of the plow bottoms.
Figure 2:
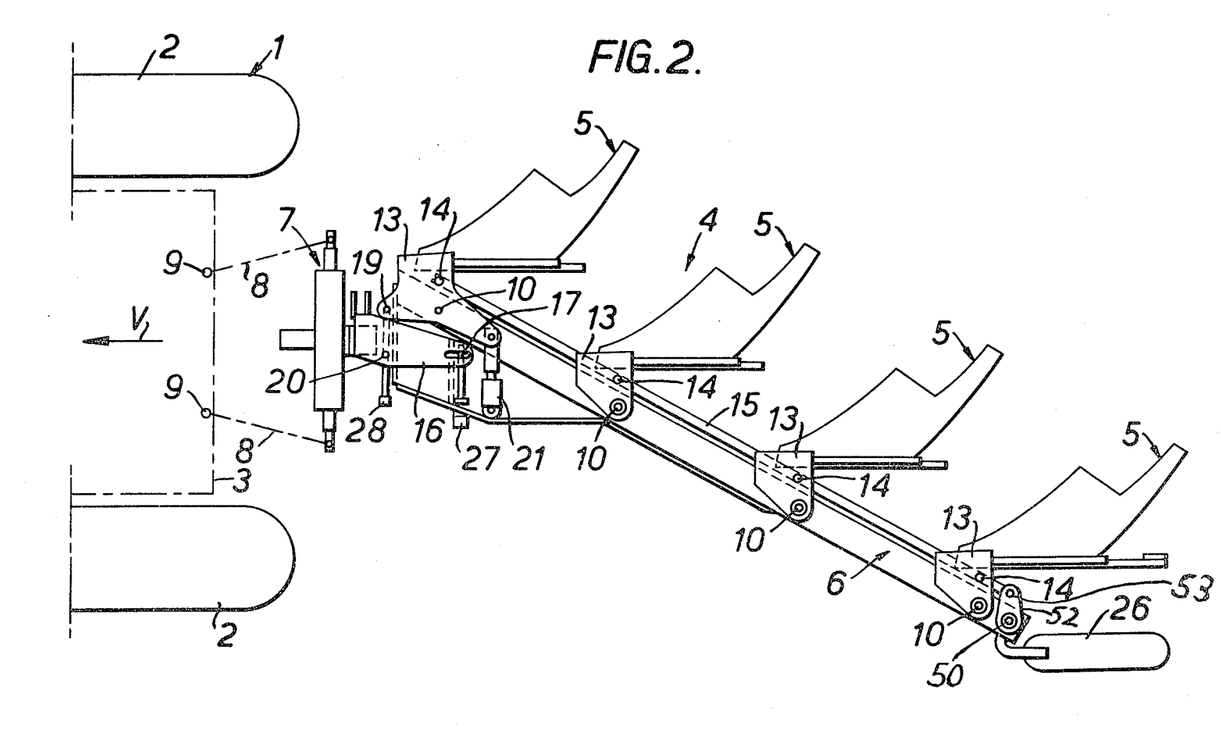
FIG. 2 is a similar view in greater detail showing one position of the plow.

In FIGS. 1 and 2, a tractor 1 is represented by its rear wheels 2 and its frame 3.

Figures 6, 7:
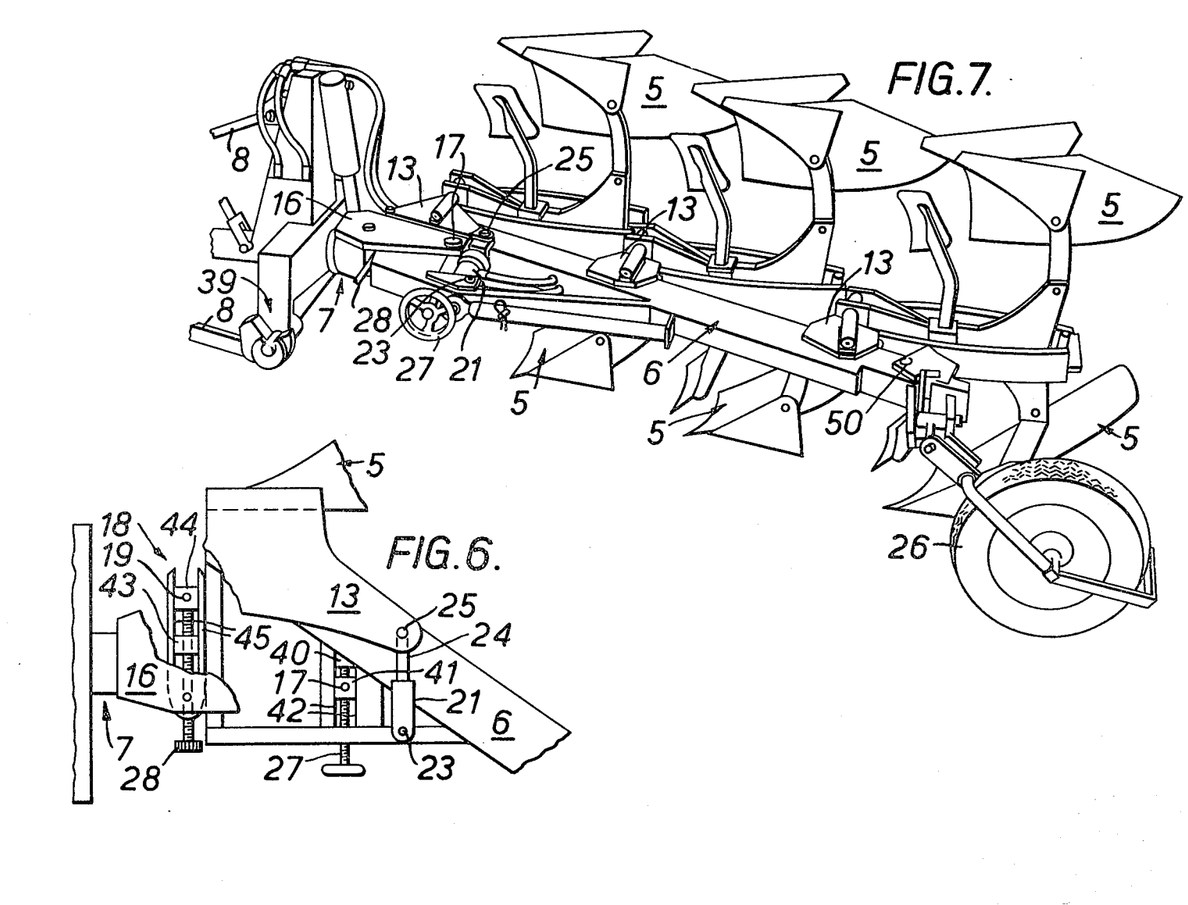
FIG. 6 is a plan view having portions broken away to slow the mechanism for adjusting the position of the foremost plow relative to the tractor wheel.
FIG. 7 is a view of a rollover or two-way plow incorporating the subject invention.

Said tractor draws a gang plow 4 which mainly comprises a plurality of plow bottoms 5, a plow beam 6 for supporting the bottoms and a forecarriage unit 7 for coupling the plow beam 6 to the usual link-arms 8 of the three-point hitch system provided at the rear of tractors. It should be noted that only the lower links 8 are shown in FIGS. 1 and 2, upper link 8 is shown in FIG. 7.

Said lower link-arms are substantially horizontal, converge in the forward direction and are each pivoted on a vertical pin 9 to the tractor frame 3 and about pivot connections 39 to the forecarriage unit 7 in order to permit pivotal displacement in a horizontal plane. The pivotal connections 39 are conventional. For example connectors of the type disclosed in U.S. Pat. No. 3,132,556 which include a connector having a spherical shaped surface that fits into a similarly shaped socket could be used.

As shown in U.S. Pat. No. 4,186,806, the plow bottoms 5 are maintained parallel to each other and are capable of controlled pivotal displacement with respect to the plow beam 6 about vertical pivot-pins 10 which are uniformly spaced along the plow beam.

Before proceeding further with the description, it will first be assumed with reference to FIG. 1 that, in each of the two plow positions shown, the forecarriage unit 7, the plow beam 6 and the bottoms 5 make up an assembly in which the parts are fixed relative to each other but capable of free displacement as a single unit in a horizontal plane by virtue of the ability of the link-arms 8 to pivot about vertical axes 9.

Each plow bottom 5 has a furrow-cutting line or so-called line of action 11. The lines of action are aligned with respect to the direction V of forward travel.

In the angular position of the plow bottoms 5 with respect to the plow beam 6 is modified in a manner which will be described hereinafter, this modification being achieved as a result of unitary rotation about respective pivot-pins 10, the spacing A or in other words the pitch of the furrows to be cut either increases or decreases as the case may be an amount dA so as to assume the value A'. With respect to the last furrow 12 which has already been cut, the new line of action 11' of the foremost plow bottom which is aligned with respect to the direction of forward travel V must therefore be displaced by dA with respect to a line of action 11 which would have been the previous line of said foremost plow bottom without adjustment in order to ensure that the new furrow pitch is equal to A'. In regard to the lines of action 11' of the other plow bottoms, these lines must be displaced respectively by 2 dA, 3 dA, and so on with respect to the previous associated theoretical lines 11; this result is obtained as soon as the first line of action 11 is displaced by dA.

It is therefore observed that, in the two positions shown in FIG. 1, the line of action of each plow bottom is aligned with respect to the direction V of forward travel and that the lines of action of the plow bottoms are relatively displaced by suitable distances.

The plow in accordance with the invention is so designed and arranged that, once the angle between the plow bottoms 5 and the plow beam 6 has been adjusted and fixed, said bottoms move of their own accord into a position which conforms to this double position-setting under the action of the resistance forces exerted by the soil on the plow bottoms and by free pivotal motion of the link-arms 8 which support the aforementioned assembly.

For a description of the remainder of the plow in accordance with the invention, reference will be made more particularly to FIGS. 2 and 3.

The plow bottoms 5 are each rigidly fixed to a plow-bottom support bracket 13 which is pivoted at uniform intervals on pivot-pins 10 to the plow beam 6 and by pivot-pin 14 to a coupling member 15 consisting of a bar or connecting-rod which is of substantial length and is parallel to the plow beam 6. The pivot-pins 14 are also spaced at uniform intervals along member 15 and form collapsible parallelograms with the pivot-pins 10, with the result that when pivoted about pivot-pins 10 the plow bottoms 5 remain parallel to each other. The plurality of plow bottom assemblies interconnected by member 15 thus form a set of interconnected plow bottom assemblies.

The forecarriage unit 7 has a longitudinal rear section or extension 16 and the plow beam 6 is pivotally mounted to unit 7 at 17 near the free end of said rear section.

A coupling member 18 serves to connect the support bracket 13 of the foremost plow bottom 5 to the extension 16 and is pivotally attached at 19 and 20 respectively. The four pivot-pins 10, 17, 20, 19 (shown in FIG. 3) form a quadrilateral which is normally deformable, that is the angles can be changed, and is made rigid by locking means which constitute at the same time means for adjusting the spacing of the lines of action 11 of the plow bottoms 5.

The adjusting and locking means are constituted by a double-acting hydraulic cylinder 21, the cylinder portion 22 of which is pivotally mounted on the plow beam 6 at 23 and the rod portion 24 is pivotally mounted at 25 on the foremost support bracket 13 at a distance from the corresponding pivot-pin 10.

By way of alternative, the jack 21 could produce action between the plow beam 6 and the coupling member 15 or another support bracket 13 or alternatively between the member 15 and one of the support brackets 13.

The hydraulic cylinder 21 is controlled from the operator's deck of the tractor. The degree of extension of the hydraulic cylinder is representative of the angle made by the line of action 11 of the plow bottoms 5 with the plow beam 6. Said extension is controlled from the operator's deck by any suitable means of known type and in such a manner as to enure that the operator can indicate and obtain the desired angle of inclination of the plow bottoms with respect to the beam.

When the hydraulic cylinder 21 is actuated, the quadrilateral 10, 17, 20, 19 undergoes deformation. When the hydraulic cylinder is not actuated, however, it constitutes a stop which locks said quadrilateral and therefore prevents any relative movement between the plow beam 6, the forecarriage unit 7, the plow-bottom support brackets 13 and the connecting members 15 and 18.

The following is a list of symbols and their meanings that are used throughout the specification:

V = Direction of forward travel.
A = Original spacing or pitch between furrows.
dA = Variation (increase or decrease) in A as a result of an adjustment.
A' = New sapcing or pitch between furrows (A+dA).
a = Initial angle, expressed in degrees between the lines of action and the plow beam.
da = Variation, expressed in degrees, between the lines of action and the plow beam as a result of an adjustment.
da' = Rotation, expressed in degrees, of the forecarriage unit (7) with respect to the plow bottom as a result of an adjustment.
da" = Rotation, expressed in degrees, of the forecarriage unit (7) about pivot pin (17), as a result of an adjustment.
L = spacing of the plow bottoms along the plow beam.
e = Transverse movement of the forecarriage unit as a result of an adjustment.
$B_1$ = Long base of the rectangular trapezoid (17 to 20).
$B_2$ = Short base of the rectangular trapezoid (10 to 19).

Starting from the plowing position which is shown in full lines in FIG. 1 and in which the lines of action 11 are aligned with respect to the direction of forward travel V, if the hydraulic cylinder 21 is actuated in the direction of an increase in the spacing A of the lines of action 11 of the plow bottoms 5, the resistance forces exerted by the soil on the plow bottoms have the effect of maintaining these latter in a position in which the new lines of action 11' remain naturally aligned with respect to the direction of forward travel V or, in other words, the plow bottoms 5 remain parallel to each other. At the same time, the plow beam 6 and the forecarriage unit 7 undergo a displacement with respect to the tractor which is permitted by the pivotal connection of link-arms 8 to the tractor 1 and to the foregoing unit 7. In consequence, the new lines of action 11' are displaced transversely with respect to the first lines of action 11 over distances which are defined by the geometry of the assembly.

The variation dA in spacing of the lines of action of the plow bottoms is a simple trigonometric function of the initial angle a of the lines of action with the plow beam and of the variation da of said angle and said variation is proportional to the spacing L of the bottoms along the plow beam.

In practice, the spacing L is within the range of 700 mm to 1000 mm, the angle a is within the range of 25° to 30° and the variation da is of small magnitude, namely a maximum of 5° above and below the value a.

Figure 4:
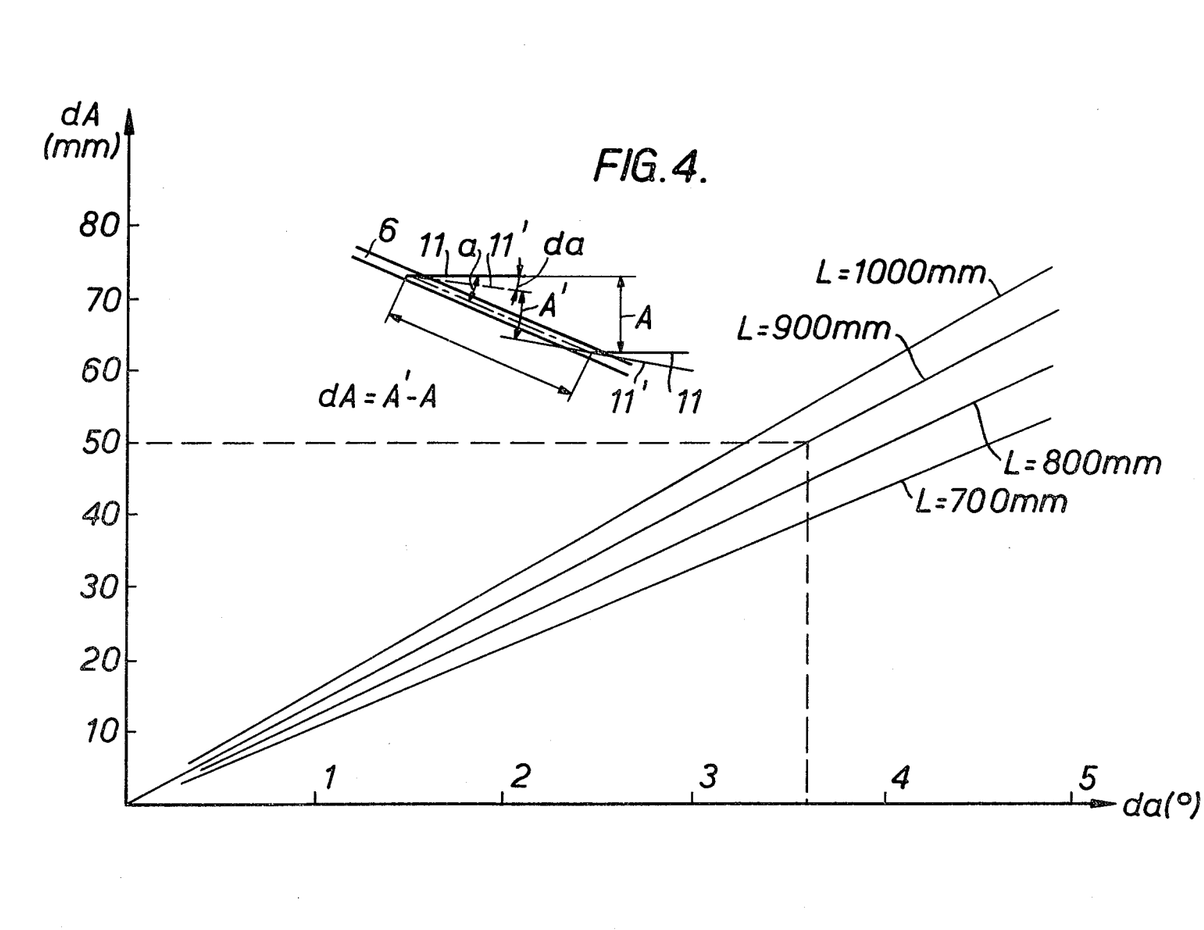
FIGS. 4 and 5 are graphs which serve to determine the geometry of the system in accordance with the invention.

There is shown in FIG. 4 a family of curves in which the value of dA given in respect of several values of L is plotted as ordinates in millimeters as a function of da plotted as abscissae in degrees, when a is within the range of 25° to 30°. This determination is made with an approximation of about 2%, which is quite sufficient in the technical field considered.

In the case of other values of L, a and da which depart from the values in current use, those skilled in the art will be able to apply the following relation with the desired approximation:

$$dA = L[\sin(a+da) - \sin a]$$

Assuming for the sake of illustration that the plow beam 6 is stationary during operation of the hydraulic cylinder 21 and that the link-arms 8 are dispensed with, the variation da of the angle a causes the following movements by deformation of the quadrilateral: rotation da of each plow bottom 5 about its pivot-pin 10, rotation da" of the forecarriage unit about the pivot-pin 17 and relative rotation da' of the forecarriage unit 7 with respect to the plow bottoms. After such an adjustment has been completed and the plow is pulled forward the bottoms return automatically to the position of alignment with respect to the direction of forward travel V, the forecarriage unit 7 therefore undergoes a pivotal displacement through the angle da' by rotation of the link-arms 8 about the pivots 9 and 39. During this pivotal movement, the forecarriage unit 7 also undergoes a displacement which has a component transversely to the direction V, the value e, see FIG. 5, of said component being a simple function of the quadrilateral formed by the two arms 8.

Figure 5:
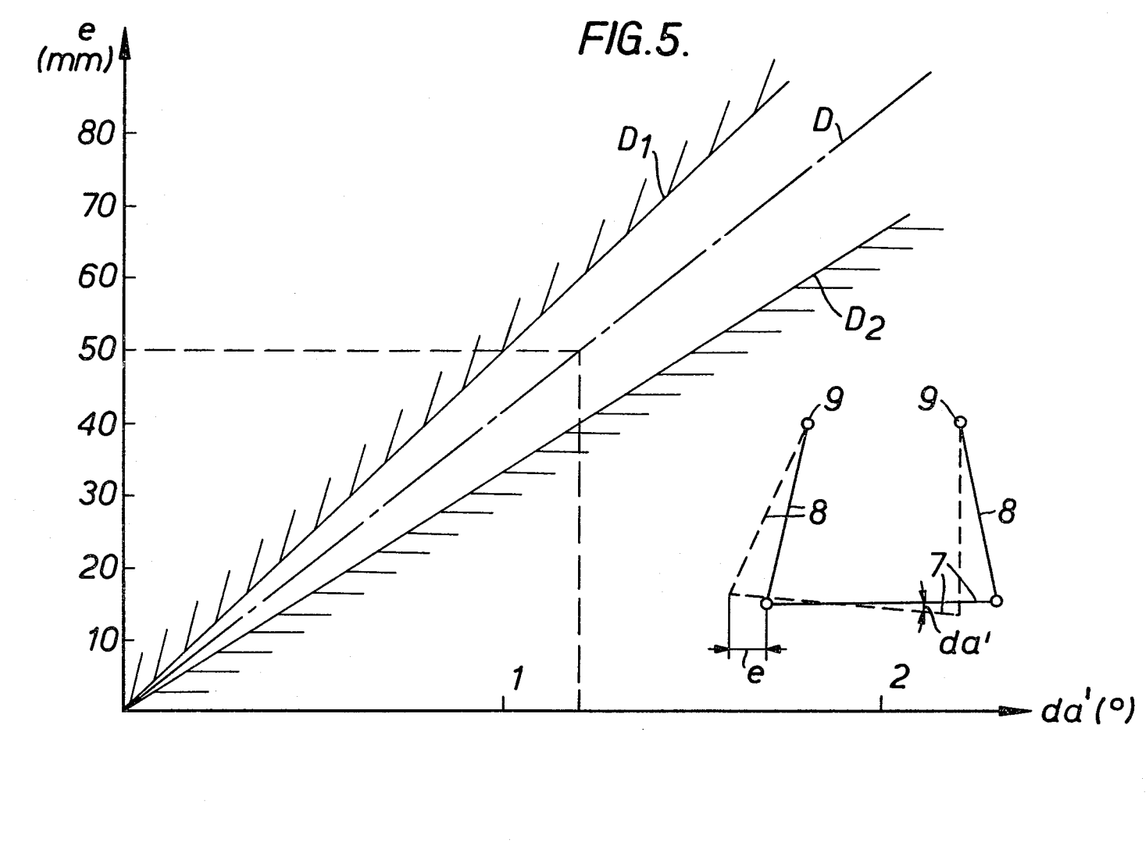

There is shown in FIG. 5 a curve D which is representative of the value of e as a function of da' in respect of low values of da'. The values of e are expressed in millimeters in ordinates and the values of da' are expressed in degrees in abscissae.

The two straight lines $D_1$, $D_2$ represent the values of e as a function of da' in the case of extreme types of link-arms 8 at present in existence, the straight line D being the line of mean values between the values of e on the straight lines $D_1$ and $D_2$.

The geometry of the quadilateral 10, 17, 20, 19 (shown in FIG. 3) is such that the angle da' through which the forecarriage unit 7 rotates in response to the adjustment and to the fact that the plow bottoms are maintained in a position of alignment with respect to the direction of forward travel V results in a transverse displacement of the forecarriage unit 7, the value e of said displacement being equal to the variation dA in spacing of the lines of action of the plow bottoms.

By means of the four points of articulation 10, 17, 20, 19 of the quadrilateral, the result thereby achieved is that the line of action of the foremost plow bottom 5 undergoes a transverse displacement during adjustment by a quantity equal to the variation in spacing of the lines of action of the plow bottoms.

In the preferred embodiment of the invention, the quadrilateral 10, 17, 20, 19 is a rectangular trapezoid in the mean position of adjustment (da=0). The long base of the trapezoid is defined by the points of articulation 17, 20, the short base of the trapezoid is defined by the points of articulation 10, 19 and the short side perpendicular to the bases is defined by the points of articulation 19, 20.

If $B_1$ and $B_2$ are the lengths of said bases, the angular variations da and da" are in the ratio of $B_1$ to $B_2$ with a sufficient approximation, small angular variations being taken into account.

The angle da' through which the forecarriage unit 7 rotates with respect to the plow bottoms is equal to the difference between the variations da and da"; the linear relations of FIGS. 4 and 5 therefore establish the ratio $B_1/B_2$ which is characteristic of the trapezoid.

In a practical example of construction, the following geometry has been adopted: L=900 mm, $B_1$=300 mm, $B_2$=200 mm; as shown in FIGS. 4 and 5, a variation dA of 50 mm is represented by an angle da of 3.6° and an angle da' of 1.2°.

In known matter, the plow beam 6 is equipped at the rear with at least one gauge wheel 26 which bears on the ground. Gauge wheel 26 is pivotally mounted to the beam 6 at 50 and includes a lever arm 52 which is pivoted to coupling member 15 at 53 such that the expansion or contraction of hydraulic cylinder 21 results in pivotal movement of gauge wheel 26. When hydraulic cylinder 21 is expanded, thereby increasing the spacing between furrows, gauge wheel 26 is pivoted in the counterclockwise direction to thus properly position it for the new attitude of the plow beam 6. Likewise when the hydraulic cylinder 21 is contracted, guage wheel 26 is pivoted in the clockwise direction and again assumes the proper attitude for the narrower furrow spacing. In the case of a rollover plow, the rear section or extension 16 of the forecarriage unit 7 is capable of pivotal displacement about a longitudinal axis through an angle of 180°.

Figure 3:
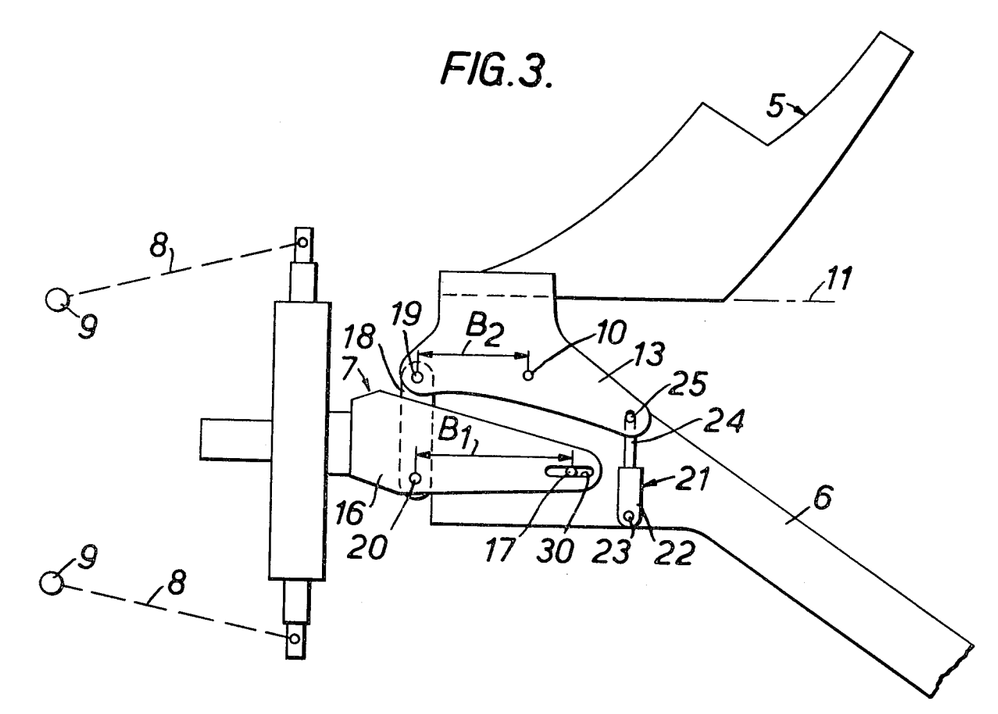
FIG. 3 is a similar view to a larger scale and illustrating the operation of the plow in accordance with the invention.

As shown diagrammatically in FIG. 3, at least one of the four articulations 10, 17, 20, 19 of the aforementioned deformable quadrilateral can be set in different positions in order to adjust the value e exactly to the value dA. This makes it possible to adapt the plow in accordance with the invention to different geometries of the link-arm 8 and to different values of the spacing L and of the intitial angle of inclination a of the plow bottoms 5 with respect to the beam 6. In the embodiment adopted by way of example, the articulations 10, 17 consist of pivot-pins which are carried by the plow beam 6. The pivot-pin 17 can be positionally adjusted within an elongated slot 30 which is aligned with the pivot-pin 20. Locking in position is carried out by any suitable means. By virtue of this arrangement, the ratio $B_1/B_2$ can be adjusted while the quadrilateral 10, 17, 20, 19 is permitted to retain its characteristic of rectangular trapezoid in the mean position of adjustment of spacing of the plow bottoms.

In accordance with another distinctive feature (shown in FIGS. 2 and 6), provision is made for means whereby the position of the line of action of the foremost plow bottom at the outset can be adjusted transversely to the track or wheel spacing of the tractor by means of a general transverse displacement of the plow beam 6 and of the components carried by this latter with respect to the forecarriage unit 7. With this objective, the end of a transverse lead-screw 27 is journaled in a member 40 carried by the plow beam 6 and is threaded through a block 41 which carries the pivot-pin 17. The block 41 is confined to slide within a smooth-walled sleeve 42 integral with beam 6. A transverse lead-screw 28 is journaled in a member 43 and is threaded through a block 44 which carries pivot pin 19. The block 44 is confined to slide within a smooth-walled sleeve 45 integral with coupling member 18. Thus by adjusting lead-screws 27 and 28 equal amounts the plow beam 6 and the components carried by it can be moved transversely to provide the desired line of action of the foremost plow relative to the tractor wheel 2.

FIG. 7 is an illustration of the subject invention incorporated into a fully mounted two way or rollover plow. Conventional reversing mechanism and trip mechanism such as disclosed in the previous mentioned U.S. Pat. No. 3,554,294 and U.S. Pat. No. 3,662,840, respectively, can be utilized in a two way plow of this type and have no effect upon the subject invention. The forecarriage unit 7 includes a front section and rear section 16 which are pivotally connected to permit pivotal displacement of the rear section relative to the front section about a longitudinal axis through the angle of 180°.

What is claimed is:

1. A fully mounted plow system adapted to be mounted on and pulled by a tractor, said system comprising a hitch assembly including link arms adapted to be supported by the tractor at their forward ends such that they are capable of slight pivotal displacement about vertical axes, a forecarriage unit mounted on the rearward ends of said link arms such that a slight pivotal movement about vertical axes are permitted therebetween, an elongated plow beam extending generally in a horizontal plane and inclined to the direction of forward travel, said forecarriage being pivotally attached to said plow beam about a generally vertical axis, a plurality of plow bottom assemblies each including a support bracket, each plow bottom assembly being pivotally attached through said support brackets along said plow beam such that said plow bottom assemblies are equally spaced along said plow beam, an elongated coupling member extending generally parallel to said plow beam and being pivotally connected to each of said support brackets forming a set of interconnected plow bottom assemblies, a coupling member pivotally attached at one end to said forecarriage unit and at its other end to the foremost plow bottom assembly, a double acting hydraulic cylinder anchored at one end to said plow beam and at its other end to said set of interconnected plow bottom assemblies such that actuation of said hydraulic cylinder will result in equal pivotal movement of each plow bottom assembly relative to said plow beam as well as a pivotal movement between said forecarriage unit and said plow beam about their pivotal connection.

2. The invention as set forth in claim 1 wherein the relative geometrical arrangement of the points of pivotal attachment of said plow beam to said forecarriage unit and to said support bracket and the points of pivotal attachment of said coupling member to said foremost plow bottom assembly and said forecarriage unit are such that, in response to adjustment of the angular position of the set of inerconnected plow bottom assemblies with respect to said plow beam by said hydraulic cylinder, the forces exerted on the plow bottoms by the soil being plowed causes the plow system to undergo a displacement at which the lines of action of the plow bottom is aligned with the direction of forward travel.

3. The invention as set forth in claim 2 wherein a rectangular trapezoid is formed by points of pivotal attachment of said plow beam to said forecarriage unit and to said support bracket and the points of pivotal attachment of said coupling member to said foremost plow bottom assembly and said forecarriage unit in which the long base is defined by said points of pivotal attachment of said forecarriage unit and the short base is defined by said points of pivotal attachment of the support bracket and the short perpendicular side is defined by the points of pivotal attachment of said coupling member.

4. The invention as set forth in claim 3 wherein the ratio of said bases is equal to the ratio of relative rotation of the plow bottom assemblies with respect to the plow beam and the forecarriage unit with respect to said plow beam.

5. The invention as set forth in claim 1 wherein a rectangular trapezoid is formed by points of pivotal attachment of said plow beam to said forecarriage unit and to said support bracket and the points of pivotal attachment of said coupling member to said foremost plow bottom assembly and said forecarriage unit in which the long base is defined by said points of pivotal attachment of said forecarriage unit and the short base is defined by said points of pivotal attachment of the support bracket and the short perpendicular side is defined by the points of pivotal attachment of said coupling member.

6. The invention as set forth in claim 5 wherein the ratio of said bases is equal to the ratio of relative rotation of the plow bottom assemblies with respect to the plow beam and the forecarriage unit with respect to said plow beam.

7. The invention as set forth in claim 6 wherein at least one of said points of pivotal attachment is adjustable to thereby vary said ratio.

8. The invention as set forth in claim 1 or 2 in which at least one of said points of pivotal attachment is adjustable.

9. The invention as set forth in claims 1 or 2 wherein said plow system includes means for producing transverse displacement of said plow beam and said set of interconnected plow bottom assemblies with respect to said forecarriage unit.

10. The invention as set forth in claims 1 or 2 wherein said forecarriage unit includes front and rear sections which are pivotally connected to permit pivotal displacement of the rear section relative to the front section about a longitudinal axis through an angle of 180°, said front section being mounted on the rearward ends of said link arms and said pivotal attachment of said opening member and said plow beam to the forecarriage being to said rear section.

* * * * *